United States Patent [19]

Weaver

[11] Patent Number: 4,919,813

[45] Date of Patent: Apr. 24, 1990

[54] PHOTOENHANCED ANAEROBIC DIGESTION OF ORGANIC ACIDS

[75] Inventor: Paul F. Weaver, Golden, Colo.

[73] Assignee: The United States of America as represented by the Department of Energy, Washington, D.C.

[21] Appl. No.: 398,604

[22] Filed: Aug. 25, 1989

[51] Int. Cl.[5] .............................................. C02F 3/28
[52] U.S. Cl. .................................... 210/603; 210/610; 210/611; 210/613; 435/267; 435/801
[58] Field of Search ................. 210/603, 605, 609–613, 210/630, 747, 170; 435/247, 253, 801, 267

[56] References Cited

U.S. PATENT DOCUMENTS

| | | | |
|---|---|---|---|
| 4,267,038 | 5/1981 | Thompson | 210/605 X |
| 4,294,694 | 10/1981 | Coulthard | 210/605 |
| 4,321,141 | 3/1982 | Messing | 210/603 |
| 4,334,997 | 6/1982 | Peterson | 210/603 |
| 4,666,852 | 5/1987 | Cork | 435/801 X |

Primary Examiner—Tom Wyse
Attorney, Agent, or Firm—Kenneth Richardson; Hugh G. Glenn; William R. Moser

[57] ABSTRACT

A process is described for rapid conversion of organic acids and alcohols in anaerobic digesters into hydrogen and carbon dioxide, the optimal precursor substrates for production of methane. The process includes addition of photosynthetic bacteria to the digester and exposure of the bacteria to radiant energy (e.g., solar energy). The process also increases the pH stability of the digester to prevent failure of the digester. Preferred substrates for photosynthetic bacteria are the organic acid and alcohol waste products of fermentative bacteria. In mixed culture with methanogenic bacteria or in defined co-culture with non-aceticlastic methanogenic bacteria, photosynthetic bacteria are capable of facilitating the conversion or organic acids and alcohols into methane with low levels of light energy input.

19 Claims, 8 Drawing Sheets

Metabolic scheme for the photoenhanced conversion of organic acids into methane.

Fig. 1

PRIOR ART

Major metabolic reactions in a dark, anaerobic digester.

Fig. 2

Metabolic scheme for the photoenhanced conversion of organic acids into methane.

Fig. 3

Conversion of propionic acid into methane by methanogenic enrichment DAD supplemented with Rps. viridis RA3, R. rubrum FR1, or Rps. sp. BPE2G and 8 W/m² continuous white light.

Fig. 4

Conversion of propionic acid into methane by pure cultures of Mb. formicium MF supplemented with Rps. sp. BFC1G, R. rubrum FR1, or Rps. capsulata B10 and 8 W/m² continuous white light.

Fig. 5

Production of methane from propionic, butyric, or acetic acids in co-cultures of Mb. formicicum MF and R. rubrum FR1 with 8 W/m² continuous white light.

Fig. 6

Effect of incident light intensity on *Rps.* sp. BFC1G for production of $H_2$ in pure culture or production of $CH_4$ with methanogenic enrichment DAD using propionic acid as catabolic substrate.

Fig. 7

Effect of incident light intensity on R. rubrum FR1 for production of $H_2$ in pure culture or production of $CH_4$ with methanogenic enrichment DAD using propionic acid as a catabolic substrate.

Fig. 8

PHOTOENHANCED ANAEROBIC DIGESTION OF ORGANIC ACIDS

CONTRACTUAL ORIGIN OF THE INVENTION

The United States Government has rights in this invention under Contract No. DE-AC02-83CH10093 between the United States Department of Energy and the Solar Energy Research Institute, a Division of the Midwest Research Institute.

BACKGROUND OF THE INVENTION

1. Field of the Invention

The present invention relates generally to anaerobic digestion of organic acids and alcohols into hydrogen and carbon dioxide and further conversion thereof to methane. Specifically, the present invention relates to a process for converting organic acids and alcohols into precursor metabolites for biological methane synthesis using photosynthetic bacteria and radiant energy.

2. Description of the Prior Art

Methane production by anaerobic fermentation (also called anaerobic digestion) involves the conversion of organic matter at modest temperatures, ambient pressures, and nearly neutral pH to methane and carbon dioxide in the absence of exogenous electron acceptors such as oxygen, nitrate, and sulfate through a series of microbial interactions. Conventional anaerobic digestion is used for waste water treatment. The rate of production of methane in such digestion, however, is usually too low to be an economically competitive process for production of methane from purchased substrates. Anaerobic digestion has been used for decades for waste treatment and disposal and as a source of fuel gas, particularly in developing countries.

Methanogens (i.e., methane-producing bacteria) have been studied for their utility in digestion processes for production of methane. To degrade complex organic substrates to methane by anaerobic digestion other organisms are necessary because of the limited number of substrates catabolized by methanogens. Such organisms are the fermentative species that convert carbohydrates, proteins, and lipids to lower molecular weight materials. These materials are then utilized by hydrogen-producing acetogenic bacteria to form acetate and hydrogen for consumption by the methanogens. Another group of acetogenic bacteria converts hydrogen and carbon dioxide to acetate and other acids.

Because there is a wide variety of organic structures in complex substrates, many different bacterial species are required to facilitate degradation of such structures. The fermentative bacteria found in operating methane fermentations supplied with complex substrates have been reported to be obligate anaerobes such as *Bacteroides, Clostridium, Butyrivibrio, Eubacterium, Bifidobacterium*, and *Lactobacillus*.

The first step in fermentation of complex substrates is extracellular enzyme-catalyzed hydrolysis of polysaccharides to oligosaccharides and monosaccharides, proteins to peptides and amino acids, triglycerides to fatty acids and glycerol, and nucleic acids to nitrogen heterocycles, ribose and inorganic phosphate. The sugars are degraded through pyruvate to acetate, higher fatty acids, carbon dioxide, and hydrogen. The amino acids and glycerol are degraded by the glycolysis pathway to the same products. After hydrolysis and glycolysis, some of the fermentation products are suitable substrates for the methanogens, but most are not.

Conventional degradation of the substrates not suitable for methanogens is caused by another group of anaerobes called acetogenic bacteria. These bacteria convert the alcohols and higher acids to acetate, hydrogen, and carbon dioxide An example of this type of bacteria is the S organism from the "*Methanobacterium omelianskii*" consortium.

It has been previously recognized that at least three groups of bacteria are involved in anaerobic digestion. Fermentative bacteria accomplish hydrolysis and conversion of the substrates to intermediates and their transformation to acetate, higher acids, hydrogen, carbon dioxide, and other low molecular weight compounds. Additional acetate, hydrogen, and carbon dioxide are produced by the acetogenic bacteria, and the methanogenic bacteria yield methane and carbon dioxide from acetate, and methane and water from hydrogen and carbon dioxide. Methane fermentation can be carried out in batch, semicontinuous or continuous processes.

In efforts to increase the economical production of methane using anaerobic digestion processes, various techniques have been attempted. These efforts have included adding high loadings of solids; immobilizing bacteria on solid supports; adding materials such as activated carbon, fly ash, enzymes, cultures and growth factors; pretreating the solids chemically or physically; and designing various types of digesters.

The slow steps of the soluble reactions that occur in anaerobic digestion are the conversion of organic acids into hydrogen, carbon dioxide, and acetate, and also the conversion of acetate into methane. This apparently is due to energy constraints.

Figure 1:
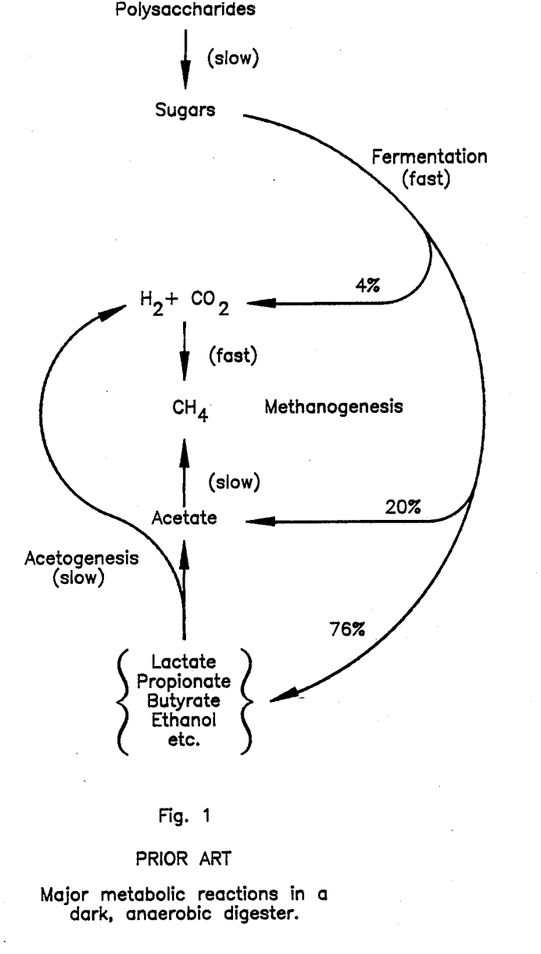
FIG. 1 illustrates major metabolic reactions in a dark anaerobic digester.

Analysis of batch anaerobic digesters indicates that only 4% of the methane produced results directly from the hydrogen and carbon dioxide generated during fermentation. Twenty percent results directly from fermentative acetic acid and seventy-six percent results indirectly from other organic acids following obligate proton-reducing acetogenesis. The separate steps are shown in FIG. 1.

Methane production from organic acids, including acetic acid, is slow compared to that resulting from hydrogen and carbon dioxide. The slow conversion of organic acids into methane precursors is understandable from energetic bases, because little free chemical energy becomes available. The reactions proceed in the direction of organic acid breakdown only because the hydrogen product is scavenged to very low concentrations by methanogenic bacteria. With this necessary requirement for low steady-state levels of hydrogen, methane production is far less than maximal.

It has been reported that average digester rates of about one volume of methane produced per equal volume of liquid per day (VVD) can be increased to about 20-40 VVD when supplemental hydrogen is provided, and it can be increased to 220 VVD when hydrogen at high pressures to effect increased mass transfer of gas is combined with cell recycle. If hydrogen is placed in solution the requirement for high pressures is not necessary.

Previously, there has been no technique or process for simple and effective increase in methane production in anaerobic digestion processes.

SUMMARY OF THE INVENTION

It is an object of this invention to provide a process for enhancing the conversion of organic acids and alcohols to hydrogen and carbon dioxide under anaerobic conditions.

It is another object of this invention to utilize photosynthetic bacteria in a digestion process.

It is another object of this invention to utilize photosynthetic bacteria and solar energy in a digestion process.

Additional objects, advantages, and noel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

To achieve the foregoing and other objects and in accordance with the purpose of the present invention, as embodied and broadly described herein, the invention may comprise an improved anaerobic digestion process which involves the use of photosynthetic bacteria in the digester and the exposure of this bacteria to radiant energy (e.g., sunlight). This results in rapid conversion of the organic acids and alcohols which are commonly found as intermediates into hydrogen and carbon dioxide, which are the optimal precursor substrates for biological methane synthesis. In other words, with the addition of photosynthetic bacteria and radiant energy (e.g., sunlight) into an anaerobic digester, the rate-limiting step of conversion of organic acids and alcohols into hydrogen and carbon dioxide is driven toward completion by the radiant energy.

By replacing the opaque top of conventional stirred anaerobic digesters with a transparent cover permitting solar penetration, and by adding to such digesters a photosynthetic bacterium of the *Rhodospirillales* order, such as *Rhodospirillum rubrum*, organic acid intermediates of the digestion process are more rapidly converted into methane with less potential for acid buildup. Because organic acids are produced as free acids by fermentative bacteria, the pH in the conventional digester can drop rapidly. This leads to digester failure, especially at high loading rates. Addition of the photosynthetic bacteria prevents this acid buildup and increases digester stability. Stirring of the medium in an opaque digester causes each photosynthetic bacterium to be briefly exposed to sunlight, followed by long periods of darkness.

Under conditions of low intensity illumination, certain strains of photosynthetic bacteria produce hydrogen from organic acids, including acetic acid. In mixed culture with methanogenic enrichments or in defined co-culture with nonaceticlastic methanogenic bacteria, photosynthetic bacteria are capable of facilitating the conversion of propionic, butyric, or acetic acids into methane with low levels of light energy input.

Other advantages of the process of the invention will be apparent from the following detailed description.

BRIEF DESCRIPTION OF THE DRAWINGS

The accompanying drawings, which are incorporated into and form a part of the specification, illustrate preferred embodiments of the present invention, and together with the description, serve to explain the principles of the invention.

DETAILED DESCRIPTION OF THE PREFERRED EMBODIMENTS

The present invention provides a technique for driving otherwise energetically unfavorable reactions in anaerobic digestion processes in an aqueous medium. This is effected by adding photosynthetic bacteria to the aqueous medium followed by exposure to radiant energy (e.g., solar energy). Any phototrophic bacteria may be used in the practice of this invention. This includes all members of the *Rhodospirillales* order of bacteria, e.g., the *Rhodospirillaceae* family, and the *Chromatiaceae* family such as *Chromatium vinosum*.

In an anaerobic digester there are normally present fermentative bacteria, acetogenic bacteria, and methanogenic bacteria. The fermentative bacteria convert hydrolyzed polymers (soluble sugars, peptides, and long chain fatty acids) to organic acid and alcohol intermediates. These intermediates are then converted into hydrogen, carbon dioxide, and acetic acid by acetogenic bacteria, followed by conversion of the hydrogen, carbon dioxide, and acetic acid into methane by the methanogenic bacteria. The conversion of the acid and alcohol intermediates into methane is slow, relative to the rates of conversion of hydrogen and carbon dioxide into methane.

The addition of photosynthetic bacteria to the aqueous medium, followed by exposure to radiant energy, speeds the conversion of organic acid and alcohol intermediaes to hydrogen and carbon dioxide, which can then be rapidly converted to methane by means of the methanogenic bacteria.

Figure 2:
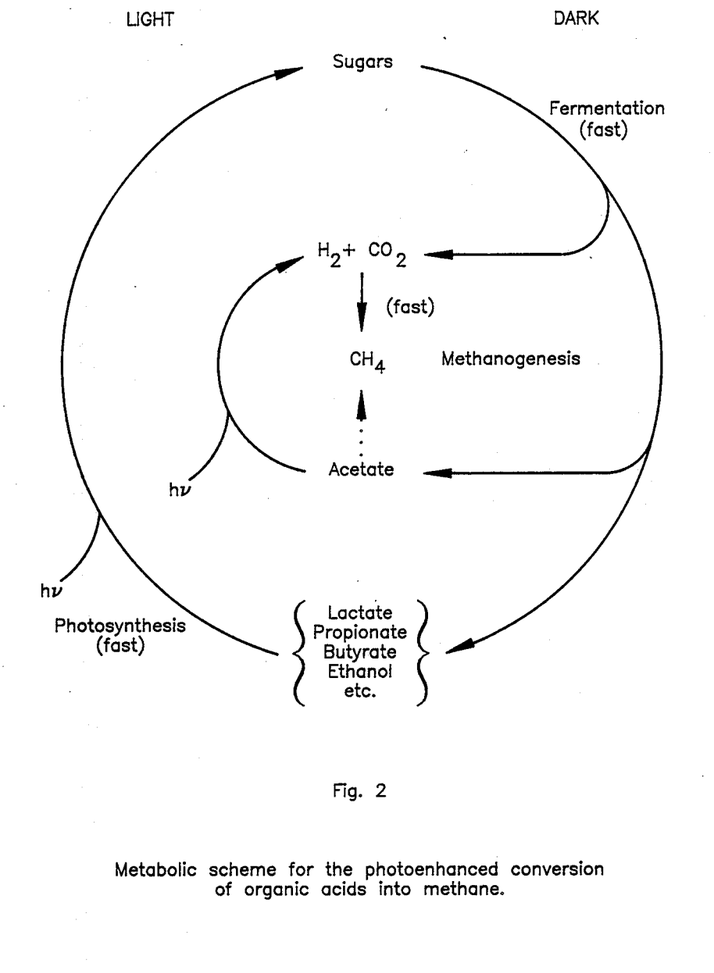
FIG. 2 illustrates the metabolic reactions in photoenhanced conversion of organic acids and alcohols into methane.

The preferred substrates for photosynthetic bacteria are the organic acid and alcohol waste products of fermentative bacteria, which can be photo-assimilated by the photosynthetic bacteria into cell storage material during periods of illumination and then refermented into primarily hydrogen, carbon dioxide, and acetic acid products during succeeding periods of darkness. Acetic acid can be further converted to hydrogen plus carbon dioxide by light-dark cycles. Repetitive light-dark cycles thus provide the energy and the mechanism for rapidly removing organic acids and alcohols and converting them into the optimal substrates (i.e., hydrogen and carbon dioxide) for methanogenic bacteria. See FIG. 2.

Conversion of organic acids into hydrogen and carbon dioxide by photosynthetic bacteria occurs under either of two conditions involving low intensity radiant (e.g., solar) energy inputs. The activity is induced either by very low intensity continuous illumination (as would occur at the bottom of a lagoon during daylight hours) or by repetitive short periods of sunlight followed by long periods of darkness (as would be perceived by a bacterium in a stirred tank reactor or vessel with a transparent cover as it tumbled into and out of the photic zone). The common factor for both conditions is that photosynthetic and dark, fermentative metabolisms are simultaneously induced.

Use of photosynthetic bacteria to convert organic acids into precursor metabolites for biological methane synthesis requires the simultaneous presence of photoassimilatory and dark, fermentative metabolic pathways. Previous work indicated that diverse organic acid, alcohol, sugar, sugar acid, and aromatic substrates were readily photoassimilated into endogenous sugar polymers by photosynthetic bacteria exposed to low levels (8 W/m$^2$) of continuous white light. The dark, fermentative breakdown of the newly synthesized endogenous sugars into hydrogen and carbon dioxide was slower and therefore the rate-limiting step in the overall photo-enhanced conversion of the substrates, including organic acids and alcohols, into methane.

In order to identify photosynthetic bacterial strains that were adept at rapid fermentative metabolism, about 250 pure strains were screened for their ability to grow on exogenous fructose or pyruvate in darkness under anaerobic conditions. The presumption was that rapidly fermenting strains would also degrade their endogenous sugar polymers at higher rates and product hydrogen and carbon dioxide at higher rates. About 40 of these strains grew well fermentatively, another 40 grew moderately well, and the remainder grew poorly.

The 40 fast-fermenting strains were further tested for their capacity to produce hydrogen fermentatively. Surprisingly, only four produced significant amounts of hydrogen in the gas phase. The other 36 strains, mostly *Rhodopseudomonas* species, either produced hydrogen to very low partial pressures or to less than detectable levels. These observations may be misleading, however, because one strain that was adapted to long-term fermentative dark growth using strict anaerobic techniques eventually produced 1.5 moles of hydrogen per mole of fructose consumed along with considerable amounts of lactic acid.

The fast-fermenting strains were all singly established in mixed culture with a methanogenic enrichment using propionic acid as the catabolic substrate and 8 W/m$^2$ continuous light. The enrichment can use hydrogen plus carbon dioxide, formic acid, and to a lesser extent lactic acid as substrates for methanogenesis. Propionic, butyric, and acetic acids are not used for methane production by this methanogenic enrichment. At least two groups were apparent among the mixed cultures established on propionic acid. One group exhibited a photoenhancement effect with little lag in methane production. The second group did not evolve detectable levels of hydrogen and produced methane only after a long lag and at rates of about 10–20% of the first group.

Figure 3:
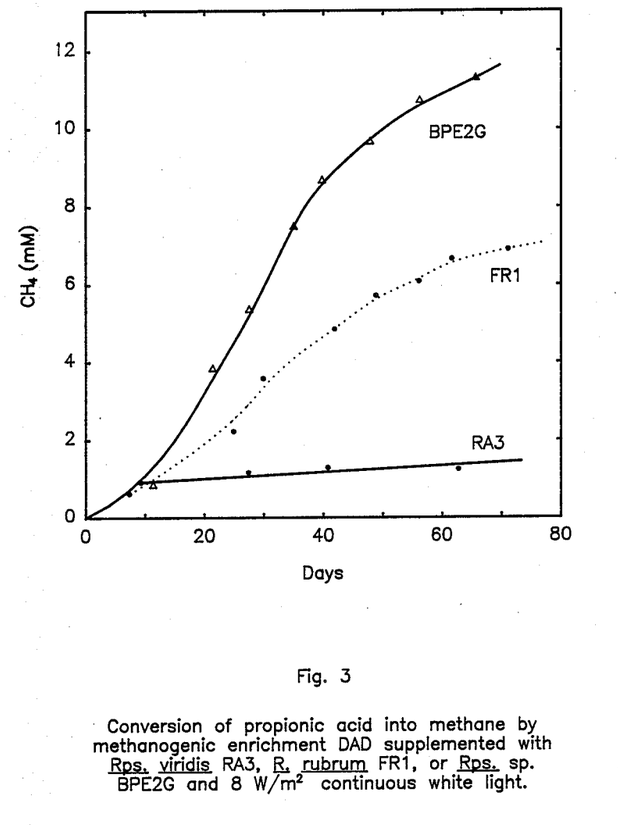
FIG. 3 is a graph illustrating conversion of propionic acid into methane.

In general, the photosynthetic bacterial strains which produced the most hydrogen in pure cultures also produced the most methane in mixed cultures with the methanogenic enrichment. However, there were several exceptions. Methane production from propionate in cultures incorporating *Rhodopseudomonas* sp. BFC was among the highest of those tested, even though hydrogen concentrations in the gas phase of pure cultures was only found at low micromolar ($\mu$m) levels. *Rhodospirillum rubrum* FR1, on the other hand, produced methane at significant but lower rates (see FIG. 3), yet evolved hydrogen into the gas phase of pure cultures to millimolar (nM) concentrations.

These data suggested that perhaps there were two mechanisms involved which allowed photosynthetic bacteria and light energy to enhance methane production in mixed cultures: (1) by converting propionic acid into hydrogen plus carbon dioxide as in the case of R. rubrum; and (2) by converting propionic acid into some other metabolite, such as lactic acid from *Rhodopseudomonas* strains, which could be used subsequently by indigenous sulfate-reducing bacteria to produce hydrogen for the methanogen.

Figure 4:
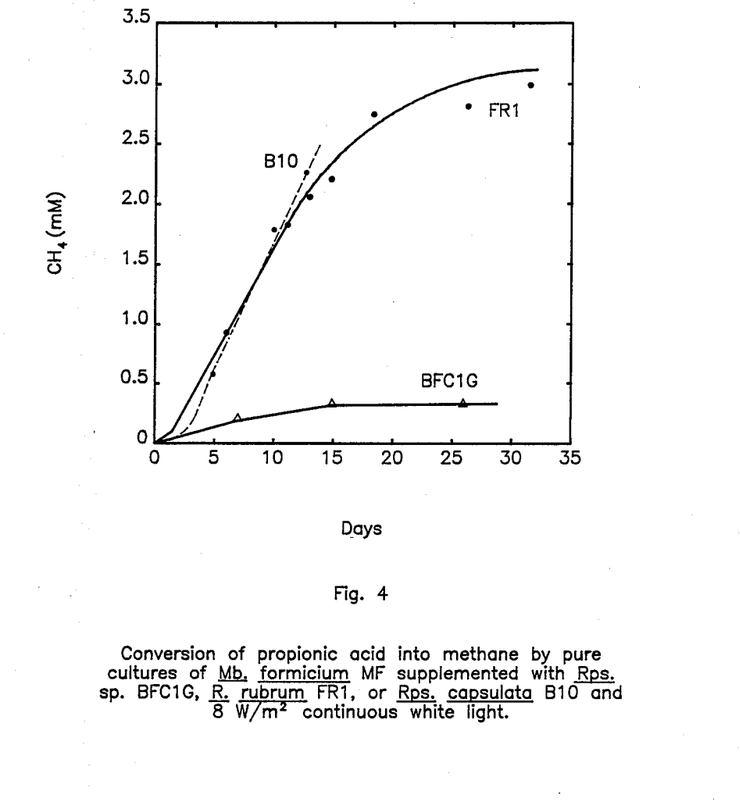
FIG. 4 is another graph illustrating conversion of propionic acid into methane.

In order to address this concern, strains of photosynthetic bacteria were established in defined co-culture with nonaceticlastic methanogenic bacteria, either *Mb. formicicum* MF or *Msp. hungatei* JF1. With propionic acid as the catabolic substrate and 8 W/m$^2$ of continuous white light, co-cultures of *R. rubrum* FR1 and *Mb. formicicum* evolved methane at rates of 11.6 $\mu$mol/h-g cells (See FIG. 4). These defined co-cultures represent what is thought to be commensalism between methanogenic and photosynthetic bacteria that provides a solar-driven mechanism for the conversion of propionic acid or oher soluble organic compounds into methane. Generation times for *R. rubrum* decreased about 40% in co-cultures compared to pure cultures, indicating that the photosynthetic bacterium was gaining some benefit from the interaction. Hydrogen scavenging may protect their light metabolism from over-reducing conditions.

*Rhodopseudomonas capsulata* B10 normally does not produce detectable levels of hydrogen in pure culture with low light conditions. In co-culture with *Mb. formicium*, however, a significant rate of methane production from propionic acid was observed, implying that a considerable amount of hydrogen was necessarily produced by the photosynthetic bacterium in co-cultures. *Rps.* sp. BFC, on the other hand, produced only uM levels of hydrogen in pure culture, high levels of methane in methanogenic enrichments, but only a small amount of methane in co-cultures. Hydrogen production by pure culture of *Rps. capsulata* can be increased by raising the redox potential of the medium by the addition of small amounts of air or by removing the hydrogen. Hydrogen production by pure cultures of *Rps.* sp. BFC can be increased by lowering the redox potential of the medium through the addition of sulfide. The hydrogen production mechanism of the photosynthetic bacterium is therefore activated in the presence of methanogenic bacteria or sulfate-reducing bacteria.

Figure 5:
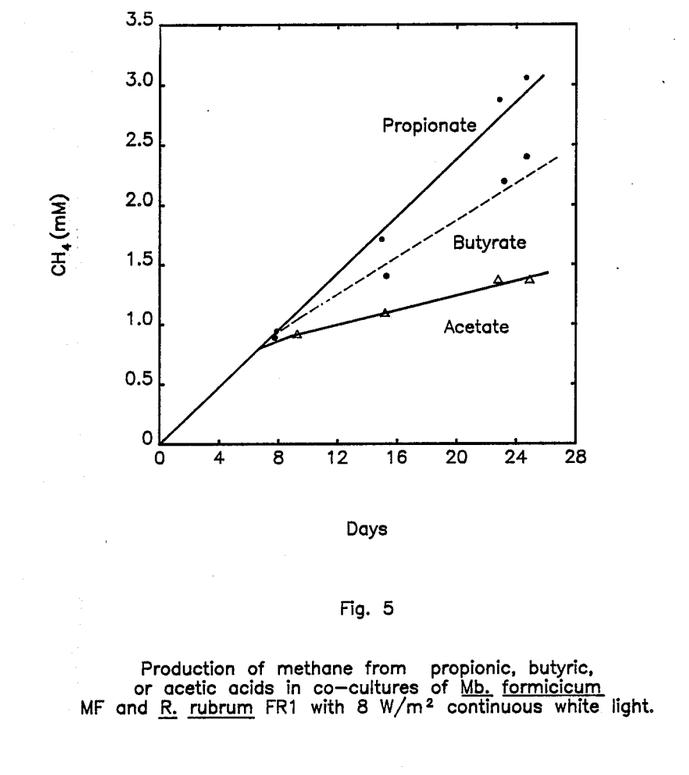
FIG. 5 is a graph illustrating the production of methane from propionic, butyric, and acetic acids in accordance with the present invention.

Butyric acid and acetic acids were also converted into methane by co-cultures of *R. rubrum* FR1 and *Mb. formicicum* at rates of 3.3 and 2.2 $\mu$mol/h-g cells, respectively. See FIG. 5.

Hydrogen production rates from photosynthetic bacteria growing on organic acids appears to depend on numerous factors, including the bacterial strain, its stage of growth in batch cultures, the light intensity employed, the catabolic substrate used, and probably the imposed redox potential of the medium.

Figure 6:
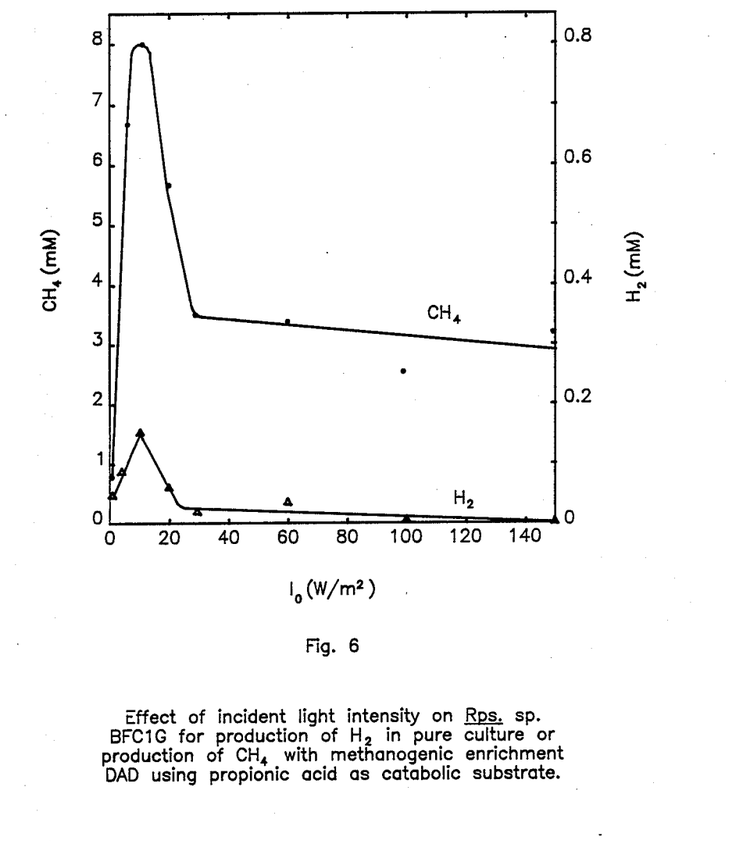
FIGS. 6 and 7 are graphs illustrating the effect of incident light intensity on different bacteria for production of hydrogen or methane.
Figure 7:
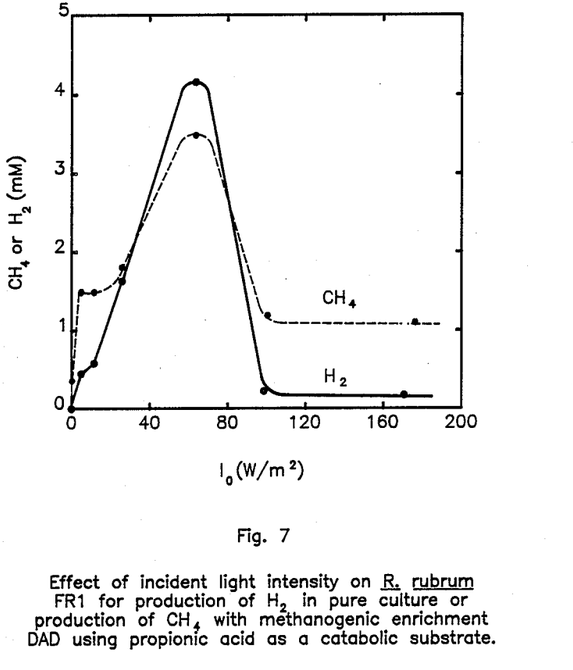

Methane production from batch cultures of methanogenic enrichments with different photosynthetic bacterial strains show a strong dependence on incident light intensity. Mixed cultures incorporating *Rhodopseudomonas* species on propionic or lactic acid exhibit a peak of activity when exposed to 8-10 W/m² continuous light. See FIG. 6. Mixed cultures incorporating *R. rubrum* FR1 show a similar peak at 8-10 W/m² but have a more dominant activity when exposed to 50-60 W/m² light. See FIG. 7.

Hydrogen production in pure cultures of *R. rubrum* strains also is maximum at the same light intensity, whereas photosynthesis required 350 W/m² to become light saturated. Kinetic measurements of hydrogen production frompropionategrown cells were maximal in samples of cultures in the mid-logarithmic phase of growth at rates of 210 μmol $H_2$/h-g cells.

The rate-limiting step for conversion of most organic acids into hydrogen appears to be in the rate of production of pyruvic acid from dark, fermentative reactions. Exogenously added pyruvic acid yields hydrogen at rates of up to 3.4 mmol/h-g cells in darkness and exogenously added formic acid yields hydrogen at 26 mmol/h-g cells, sufficient to synthesize methane at 6.5 mmol/h-g cells.

The kinetics of hydrogen production from pure cultures of *R. rubrum* FR1 grown on butyric or acetic acids are slightly more complex. Maximal activities were 132 and 76 μmol $H_2$/h-g cells for butyric and acetic acids, respectively, which were obtained from cultures in latelogarithmic or stationary phases of growth. Actively growing cultures on butyric or acetic acids exhibit three distinct kinetic rates of hydrogen production. A fast initial rate of hydrogen evolution from formic acid is followed by a second "regulated" slow rate and a third "deregulated" faster rate after about one hour in darkness. The regulation appears to be at the pyruvate-formate lyase step.

Figure 8:
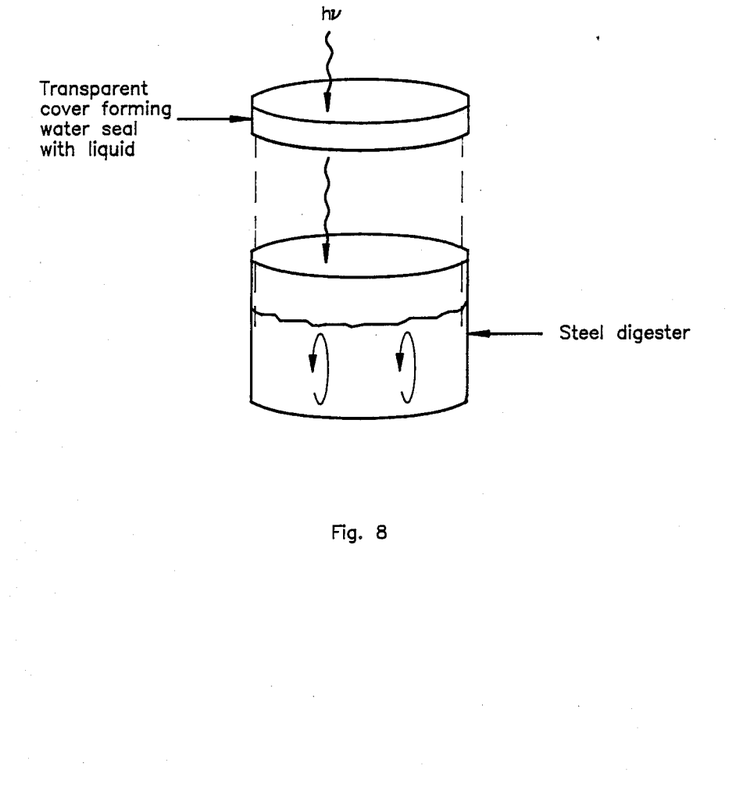
FIG. 8 illustrates a steel digester that has a light transparent cover, which is useful in the techniques of the present invention for periodic exposure of photosynthetic bacteria in the digester.

The photoenhancement effect on converting organic acids into methane requires that both the photosynthetic and dark, fermentative metabolisms of photosynthetic bacteria be operative. This may be effected by periodic exposure of the photosynthetic bacteria to radiant energy, e.g., in a stirred vessel having a transparent cover as illustrated in FIG. 8. Another useful embodiment is a lagoon system where bacteria at a depth below the surface would receive sunlight at a low continuous level during daylight hours.

Removing the steel top of a conventional digester and replacing it with a transparent one permitting solar penetration is an effective design. See FIG. 8. A single bacterium rises to the surface and is briefly exposed to sunlight before returning to the opaque depths of the digester. This type of regimen was explored with repetitive light/dark cycles on laboratory cultures. Cultures receiving 4 minutes of 125 W/m² light (about 12.5% of full sunlight) every hour were active in producing hydrogen in pure cultures and methane in mixed cultures. Methane production rates remained linear for longer periods of time than did those from cultures receiving low continuous light. Cycles of 2 seconds of light every 30 seconds were equally active. This amount of light energy is equivalent to what each centimeter of depth of a three meter deep stirred tank reactor would receive during an average day of solar exposure in the United States.

The foregoing is considered as illustrative only of the principles of the invention. Further, because numerous modifications and changes will readily occur to those skilled in the art, it is not desired to limit the invention to the exact construction and operation shown and described, and accordingly all suitable modifications and equivalents may be resorted to falling within the scope of the invention as defined by the claims which follow.

What is claimed is:

1. A method for converting organic acids or alcohols to hydrogen and carbon dioxide under anaerobic conditions in an aqueous medium comprising the steps of:
   (a) adding to said medium photosynthetic bacteria; and
   (b) exposing said bacteria to radiant energy for a time sufficient to cause said bacteria to convert said acids or alcohols to hydrogen and carbon dioxide.

2. A method in accordance with claim 1, wherein said aqueous medium is contained in a digester vessel or lagoon system and wherein said medium further comprises methanogenic bacteria.

3. A method in accordance with claim 1, wherein said aqueous medium further comprises water-soluble organic matter, fermentative bacteria, and methanogenic bacteria.

4. A method in accordance with claim 3, wherein said medium is exposed continuously to light.

5. A method in accordance with claim 3, wherein said medium is exposed to radiant energy.

6. A method in accordance with claim 5, wherein said radiant energy comprises solar energy.

7. A method in accordance with claim 5, wherein said medium is contained in a vessel having a light-transparent cover.

8. A method in accordance with claim 7, wherein said medium is stirred in said vessel.

9. A method in accordance with claim 7, wherein radiant energy is transmitted to said medium through said cover.

10. A method in accordance with claim 1, wherein said photosynthetic bacteria is selected from the group consisting of the *Rhodospirillales* order of phototrophic bacteria.

11. In a method for anaerobic digestion of organic matter in an aqueous medium comprising fermentative bacteria and methanogenic bacteria, the improvement which comprises:
    (a) adding to said medium photosynthetic bacteria; and
    (b) exposing said bacteria to radiant energy.

12. The improvement in accordance with claim 11, wherein said medium is contained in a digester vessel.

13. The improvement in accordance with claim 11, wherein said medium is exposed continuously to sunlight.

14. The improvement in accordance with claim 11, wherein said medium is exposed to radiant energy.

15. The improvement in accordance with claim 14, wherein said radiant energy comprises solar energy.

16. The improvement in accordance with claim 14, wherein said medium is contained in a vessel having a light-transparent cover.

17. The improvement in accordance with claim 16, wherein said medium is stirred in said vessel.

18. The improvement in accordance with claim 16, wherein radiant energy is transmitted to said medium through said cover.

19. The improvement in accordance with claim 11, wherein said photosynthetic bacteria is selected from the group consisting of the *Rhodospirillales* order of phototrophic bacteria.

* * * * *